US011772946B2

United States Patent
Hattori

(10) Patent No.: US 11,772,946 B2
(45) Date of Patent: Oct. 3, 2023

(54) DEVICE FOR ESTIMATING CENTER OF GRAVITY OF CARGO VEHICLE

(71) Applicant: KABUSHIKI KAISHA TOYOTA JIDOSHOKKI, Kariya (JP)

(72) Inventor: Tatsuya Hattori, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 171 days.

(21) Appl. No.: 17/292,741

(22) PCT Filed: Sep. 12, 2019

(86) PCT No.: PCT/JP2019/035982
§ 371 (c)(1),
(2) Date: May 11, 2021

(87) PCT Pub. No.: WO2020/121613
PCT Pub. Date: Jun. 18, 2020

(65) Prior Publication Data
US 2021/0395063 A1 Dec. 23, 2021

(30) Foreign Application Priority Data
Dec. 14, 2018 (JP) ................. 2018-234500

(51) Int. Cl.
*B66F 9/24* (2006.01)
*B60W 40/13* (2012.01)
*B66F 9/22* (2006.01)

(52) U.S. Cl.
CPC ............... *B66F 9/24* (2013.01); *B60W 40/13* (2013.01); *B60W 2040/1315* (2013.01); *B66F 9/22* (2013.01)

(58) Field of Classification Search
CPC ............ B66F 9/24; B66F 9/22; B66F 17/003; B60W 40/13; B60W 2040/1315; B60W 2300/121
See application file for complete search history.

(56) References Cited

U.S. PATENT DOCUMENTS 4,511,974 A 4/1985 Nakane et al.
6,611,746 B1 * 8/2003 Nagai ................... B66F 9/0755
187/222

(Continued)

FOREIGN PATENT DOCUMENTS

EP  1 136 433 A2  9/2001
JP  57-131021 A  8/1982

(Continued)

OTHER PUBLICATIONS

International Preliminary Report on Patentability dated Jun. 8, 2021 in International Application No. PCT/JP2019/035982.

(Continued)

*Primary Examiner* — Tyler J Lee
*Assistant Examiner* — Yufeng Zhang
(74) *Attorney, Agent, or Firm* — Sughrue Mion, PLLC

(57) ABSTRACT

A center of gravity estimation device includes a tilt cylinder pressure sensor detecting a pressure on a rod side of the tilt cylinder, a tilt cylinder pressure sensor detecting a pressure on a bottom side of the tilt cylinder, a lift cylinder pressure sensor detecting a pressure of a lift cylinder, and an electronic control unit performing estimation calculation of a center of gravity of a cargo W loaded on a fork using the pressure on the rod side of the tilt cylinder, the pressure on the bottom side of the tilt cylinder, the pressure of the lift cylinder, and data on a structure of a cargo handling device.

11 Claims, 10 Drawing Sheets

(56) References Cited

U.S. PATENT DOCUMENTS

| 9,114,963 B2 * | 8/2015 | McKernan | B66F 9/0755 |
| 11,142,442 B2 * | 10/2021 | Gault | B66F 9/24 |

FOREIGN PATENT DOCUMENTS

| JP | 57-131699 A | 8/1982 |
| JP | 57-131700 A | 8/1982 |
| JP | 2001-261297 A | 9/2001 |
| JP | 2009-175148 A | 8/2009 |
| JP | 2012-020814 A | 2/2012 |

OTHER PUBLICATIONS

Extended European Search Report dated Feb. 4, 2022 in European Application No. 19895614.6.
International Search Report for PCT/JP2019/035982 dated Oct. 15, 2019 [PCT/ISA/210].

* cited by examiner

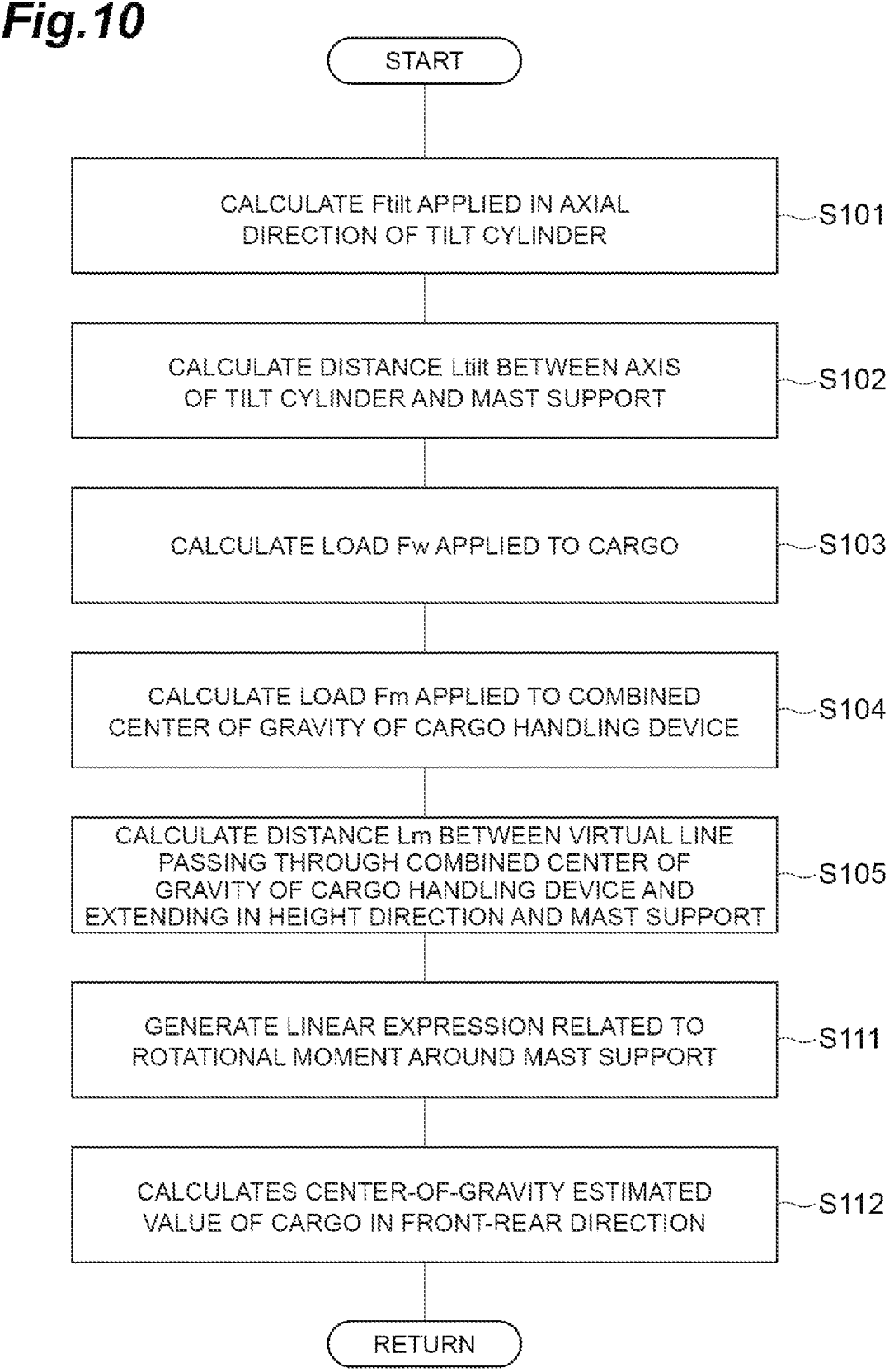

DEVICE FOR ESTIMATING CENTER OF GRAVITY OF CARGO VEHICLE

CROSS REFERENCE TO RELATED APPLICATIONS

This application is a National Stage of International Application No. PCT/JP2019/035982 filed Sep. 12, 2019, claiming priority based on Japanese Patent Application No. 2018-234500 filed Dec. 14, 2018.

TECHNICAL FIELD

The present disclosure relates to a center of gravity estimation device of a cargo handling vehicle.

BACKGROUND ART

For example, Patent Literature 1 describes a technology of detecting an axle load using a bending force measuring device fixed to a rear-side center axle body formed as a steering axle of a forklift. The bending force measuring device includes, for example, a strain gauge for measuring an amount of deformation (bending) of a measurement segment provided on a center axle body and detects an axle load from bending of the measurement segment.

CITATION LIST

Patent Literature

[Patent Literature 1] Japanese Unexamined Patent Publication No. 2009-175148

SUMMARY OF INVENTION

Technical Problem

In the above-described conventional technology, a position of a center of gravity in a front-rear direction of a vehicle body can be estimated by detecting an axle load applied to the center axle body. However, in the above-described conventional technology, since the axle load is detected using a strain gauge, it is necessary to measure a correlation between bending and a load in advance and store the correlation data in a memory. The correlation between bending and a load depends on the shape of a forklift or the like. Therefore, since work of acquiring correlation data is required for each model of forklift, versatility is low. Also, in order to accurately estimate a position of a center of gravity of a forklift in a state in which a cargo is loaded on a fork (loading part), it is necessary to estimate a position of a center of gravity of the cargo.

An objective of the present disclosure is to provide a center of gravity estimation device of a cargo handling vehicle which can estimate a position of a center of gravity of a cargo loaded on a loading part and has high versatility.

Solution to Problem

One aspect of the present disclosure is a center of gravity estimation device of a cargo handling vehicle equipped with a cargo handling device rotatably connected to a front-end portion of a vehicle body via a mast support and including a lift cylinder which raises and lowers a loading part attached to a mast and a tilt cylinder which tilts the mast, and the center of gravity estimation device of a cargo handling vehicle includes a first pressure detection unit detecting a pressure on a rod side of the tilt cylinder, a second pressure detection unit detecting a pressure on a bottom side of the tilt cylinder, a third pressure detection unit detecting a pressure of the lift cylinder, and an estimation calculation unit performing estimation calculation of a center of gravity of cargo loaded on the loading part using the pressure on the rod side of the tilt cylinder detected by the first pressure detection unit, the pressure on the bottom side of the tilt cylinder detected by the second pressure detection unit, the pressure of the lift cylinder detected by the third pressure detection unit, and data on a structure of the cargo handling device.

In such a center of gravity estimation device, the estimation calculation of the center of gravity of the cargo loaded on the loading part is performed by detecting the pressures on the rod side and the bottom side of the tilt cylinder and the pressure of the lift cylinder, and using these detected values and the data on the structure of the cargo handling device. Therefore, a position of the center of gravity of the cargo loaded on the loading part can be estimated. Also, since work for acquiring correlation data for each model of cargo handling vehicles in advance by measurement or the like is not necessary, a center of gravity estimation device having high versatility can be realized.

The estimation calculation unit may include a parameter calculation unit calculating parameters of a linear expression related to a rotational moment around the mast support on the basis of the pressure on the rod side of the tilt cylinder, the pressure on the bottom side of the tilt cylinder, the pressure of the lift cylinder, and the data on the structure of the cargo handling device, and a center of gravity calculation unit calculating a center-of-gravity estimated value of the cargo in a front-rear direction of the vehicle body on the basis of the parameters of the linear expression calculated by the parameter calculation unit and the data on the structure of the cargo handling device. In such a configuration, when it is assumed that the mast stands perpendicular to the ground, the position of the center of gravity of the cargo in the front-rear direction of the vehicle body can be estimated by performing the estimation calculation of the center of gravity of the cargo using the parameters of the linear expression related to the rotational moment around the mast support and the data on the structure of the cargo handling device.

The center of gravity estimation device of a cargo handling vehicle may further include an angle detection unit detecting a tilt angle of the mast, and a height detection unit detecting a height of the loading part, in which the center of gravity calculation unit may calculate the center-of-gravity estimated values of the cargo in the front-rear direction and a height direction of the vehicle body on the basis of the parameters of the linear expression, the data on the structure of the cargo handling device, the tilt angle of the mast detected by the angle detection unit, and the height of the loading part detected by the height detection unit. In such a configuration, the positions of the center of gravity of the cargo in the front-rear direction and the height direction of the vehicle body can be estimated by detecting the tilt angle of the mast and the height of the loading part and performing the estimation calculation of the center of gravity of the cargo using the parameters of the linear expression related to the rotational moment around the mast support, the data on the structure of the cargo handling device, the tilt angle of the mast, and the height of the loading part.

The center of gravity calculation unit may calculate the center-of-gravity estimated values of the cargo in the front-rear direction and the height direction of the vehicle body by obtaining coefficients of the linear expressions in two states with different tilt angles of the mast on the basis of the parameters of the linear expression, the data on the structure of the cargo handling device, the tilt angle of the mast, and the height of the loading part, and then solving simultaneous expressions of the linear expressions of the two states. In such a configuration, since the simultaneous expressions of the linear expressions in two states with different tilt angles of the mast are used, the center-of-gravity estimated values of the cargo in the front-rear direction and the height direction of the vehicle body can be easily calculated.

The center of gravity calculation unit may calculate a center-of-gravity estimated value of the cargo in a height direction of the vehicle body on the basis of the parameters of the linear expression, the data on the structure of the cargo handling device, and the center-of-gravity estimated value of the cargo in the front-rear direction of the vehicle body after the center-of-gravity estimated value of the cargo in the front-rear direction of the vehicle body is calculated on the basis of the parameters of the linear expression and the data on the structure of the cargo handling device. In such a configuration, since an amount of calculation of the center of gravity calculation unit is small, costs of the estimation calculation unit can be reduced.

The parameter calculation unit may calculate a load applied in an axial direction of the tilt cylinder, a distance between an axis of the tilt cylinder and the mast support, a load applied to the cargo, a load applied to a combined center of gravity of the cargo handling device, and a distance between a virtual line passing through the combined center of gravity of the cargo handling device and extending in the height direction of the vehicle body and the mast support as the parameters of the linear expression. In such a configuration, since a simple expression including the load applied in the axial direction of the tilt cylinder, the load applied to the cargo, and the load applied to the combined center of gravity of the cargo handling device as some of the parameters is used as the linear expression related to the rotational moment around the mast support, a time for the estimation calculation of the center of gravity of the cargo can be reduced.

The parameter calculation unit may calculate the load applied in the axial direction of the tilt cylinder on the basis of the pressure on the rod side of the tilt cylinder, the pressure on the bottom side of the tilt cylinder, and data on a structure of the tilt cylinder, calculate the distance between the axis of the tilt cylinder and the mast support on the basis of the data on the structure of the tilt cylinder, calculate the load applied to the cargo on the basis of the pressure of the lift cylinder and data on a structure of the lift cylinder, calculate the load applied to the combined center of gravity of the cargo handling device on the basis of the data on the structure of the cargo handling device, and calculate the distance between the virtual line and the mast support on the basis of the data on the structure of the cargo handling device. In such a configuration, the parameters of the linear expression related to the rotational moment around the mast support can be easily calculated.

Advantageous Effects of Invention

According to the present disclosure, it is possible to provide the center of gravity estimation device of a cargo handling vehicle which can estimate a position of the center of gravity of the cargo loaded on the loading part and has high versatility.

BRIEF DESCRIPTION OF DRAWINGS

FIG. 10 is a flowchart showing a procedure of calculation processing executed by a parameter calculation unit and a center of gravity calculation unit shown in FIG. 9.

DESCRIPTION OF EMBODIMENTS

Figure 1:
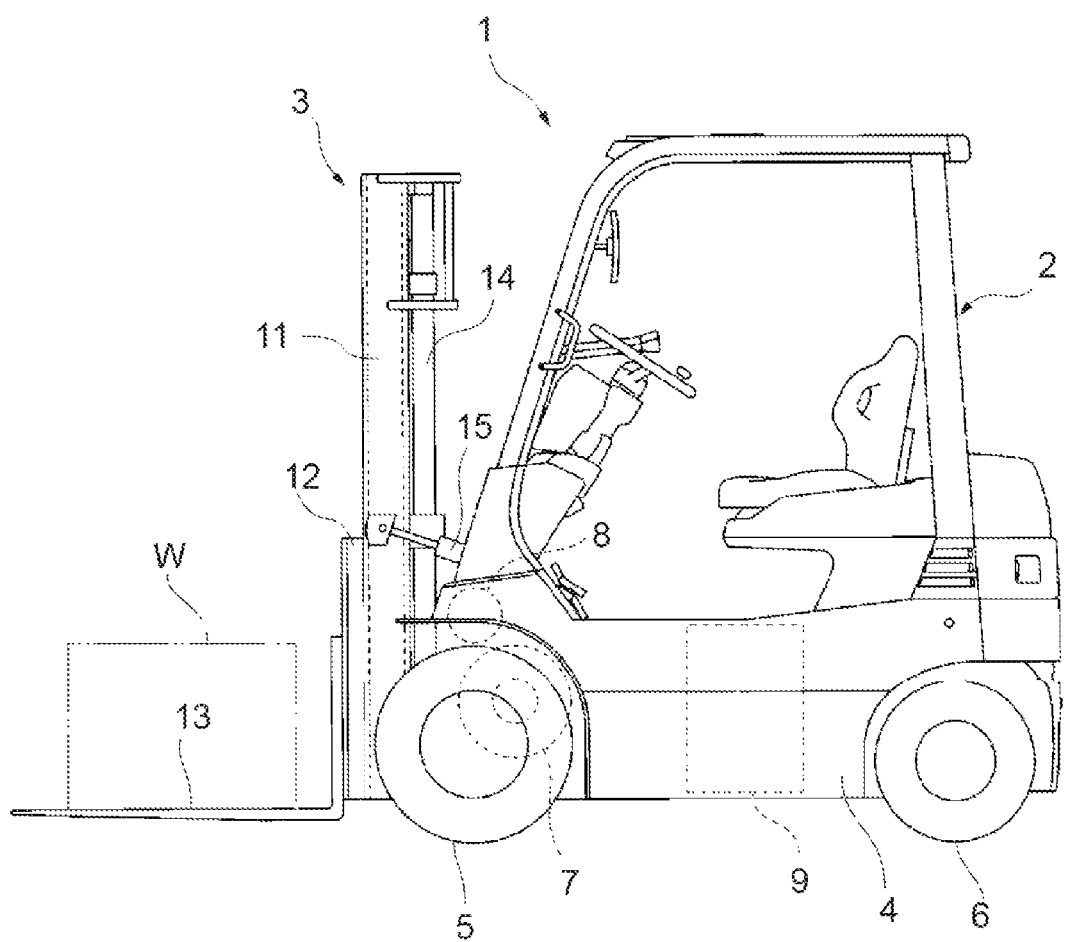
FIG. 1 is a side view illustrating a forklift as a cargo handling vehicle including a center of gravity estimation device according to one embodiment of the present disclosure.

Hereinafter, embodiments of the present disclosure will be described in detail with reference to the drawings. In the drawings, the same or equivalent elements will be denoted by the same reference signs and duplicate descriptions thereof will be omitted.

FIG. 1 is a side view illustrating a forklift as a cargo handling vehicle including a center of gravity estimation device according to one embodiment of the present disclosure. In FIG. 1, the forklift 1 serving as the cargo handling vehicle according to the present embodiment is a counter-type forklift. The forklift 1 includes a travel device 2 and a cargo handling device 3 disposed in the front of the travel device 2 to perform lifting and lowering of cargo W.

The travel device 2 includes a vehicle body 4, front wheels 5 which are a pair of driving wheels disposed at a front portion of the vehicle body 4, rear wheels 6 which are a pair of steering wheels disposed at a rear portion of the vehicle body 4, a travel motor 7 which rotates the front wheels 5, a cargo handling motor 8 which rotationally drives a hydraulic pump (not illustrated) of a hydraulic drive unit 24 (see FIG. 2) to be described below, and a battery 9 which supplies electric power to the travel motor 7 and the cargo handling motor 8.

Figure 4:
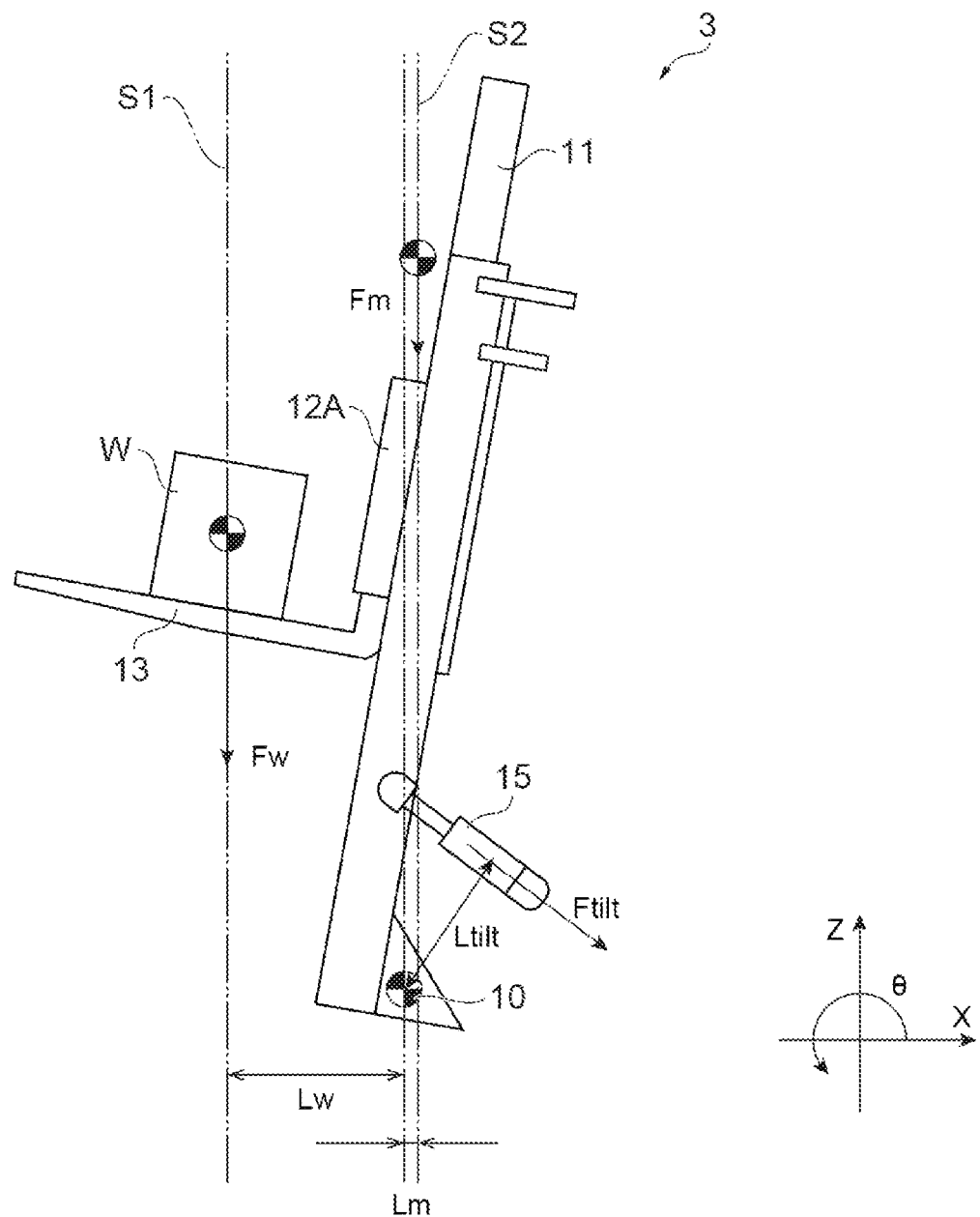
FIG. 4 is a conceptual view illustrating a rotational moment around a mast support in a cargo handling device.

The cargo handling device 3 is rotatably connected to a front-end portion of the vehicle body 4 via a mast support 10 (see FIG. 4). The cargo handling device 3 includes a mast 11 provided to stand at the front-end portion of the vehicle body 4, a pair of forks 13 (loading part) which are attached to the mast 11 via a lift bracket 12 and on which the cargo W is loaded, a lift cylinder 14 which raises and lowers the fork 13, and a tilt cylinder 15 which tilts the mast 11. The lift cylinder 14 and the tilt cylinder 15 are driven by the hydraulic drive unit 24 (to be described below).

Figure 2:
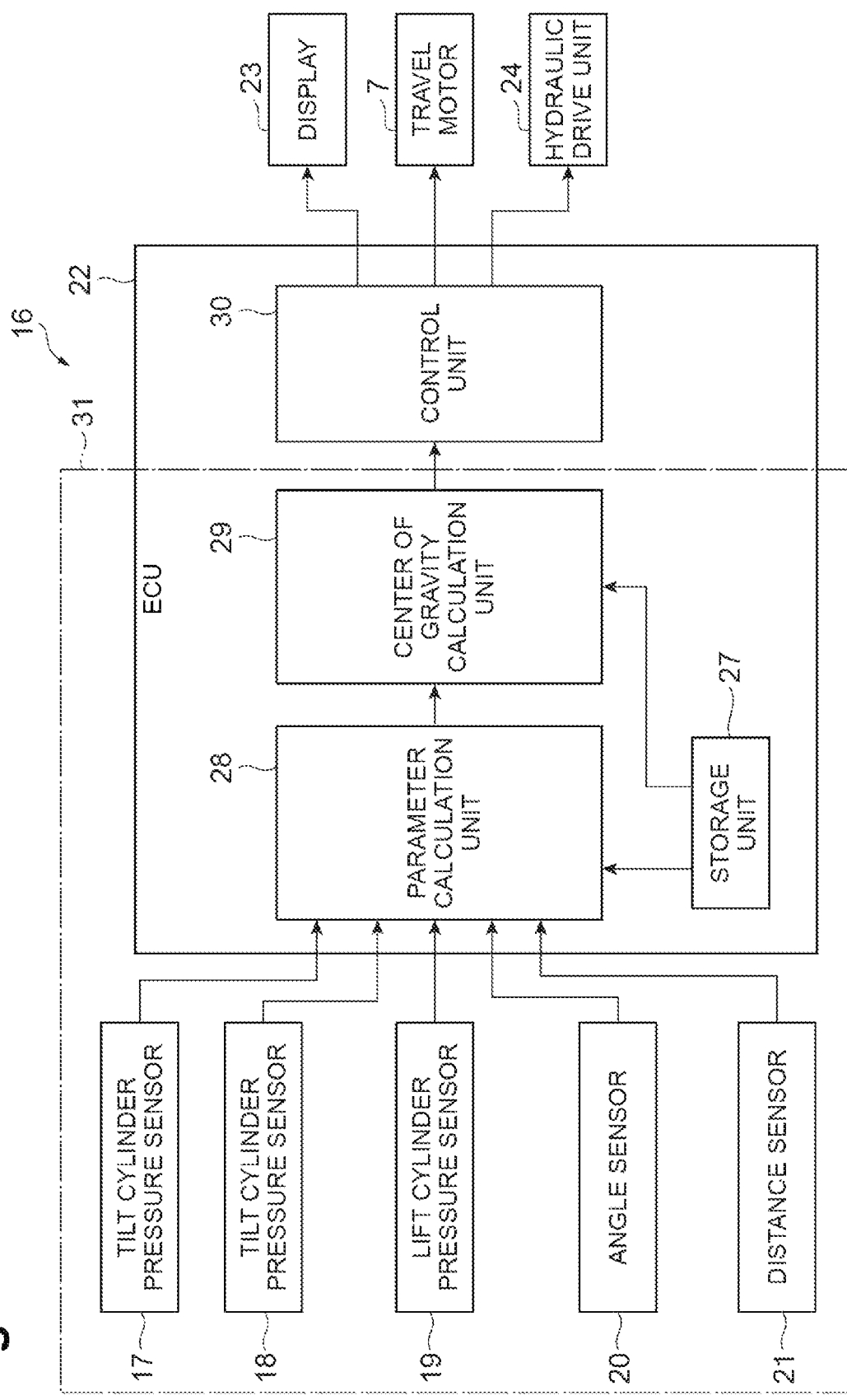
FIG. 2 is a block diagram showing a configuration of a vehicle control device including the center of gravity estimation device according to a first embodiment of the present disclosure.

FIG. 2 is a block diagram showing a configuration of a vehicle control device including a center of gravity estimation device according to a first embodiment of the present disclosure. In FIG. 2, a vehicle control device 16 is mounted on the forklift 1. The vehicle control device 16 includes tilt cylinder pressure sensors 17 and 18, a lift cylinder pressure sensor 19, an angle sensor 20, a distance sensor 21, an electronic control unit 22 (ECU), a display 23, the travel motor 7, and the hydraulic drive unit 24.

Figure 3:
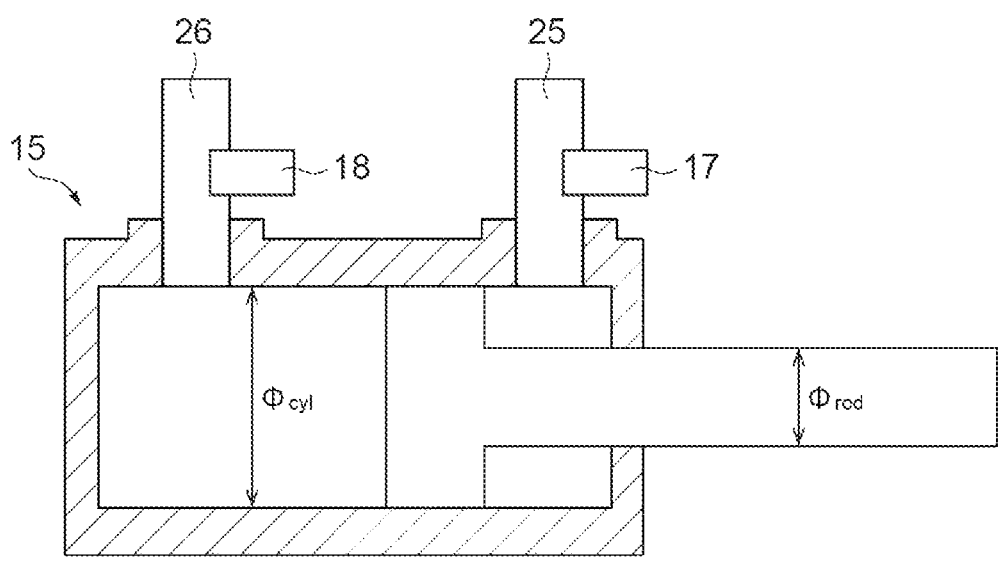
FIG. 3 is a cross-sectional view of a tilt cylinder.

As illustrated in FIG. 3, the tilt cylinder pressure sensor 17 is attached to a hydraulic piping 25 that is connected to the tilt cylinder 15 on a rod side. The tilt cylinder pressure sensor 17 constitutes a first pressure detection unit that detects a pressure on the rod side of the tilt cylinder 15. As illustrated in FIG. 3, the tilt cylinder pressure sensor 18 is attached to a hydraulic piping 26 that is connected to the tilt cylinder 15 on a bottom side. The tilt cylinder pressure sensor 18 constitutes a second pressure detection unit that detects a pressure on the bottom side of the tilt cylinder 15.

Although not separately illustrated, the lift cylinder pressure sensor 19 is attached to a hydraulic piping that is connected to the lift cylinder 14 on a bottom side. The lift cylinder pressure sensor 19 constitutes a third pressure detection unit that detects a pressure of the lift cylinder 14. Specifically, the lift cylinder pressure sensor 19 detects a pressure on the bottom side of the lift cylinder 14.

The angle sensor 20 constitutes an angle detection unit that detects a tilt angle of the mast 11. The distance sensor 21 constitutes a height detection unit that detects a height (cargo handling height) of the fork 13 by detecting a distance from the ground to the fork 13.

The display 23 displays information such as an allowable tilt angle and cargo handling height and performs a warning display related to a center of gravity of the cargo W.

Although not separately illustrated, the hydraulic drive unit 24 includes a hydraulic pump that supplies a hydraulic oil to the lift cylinder 14 and the tilt cylinder 15, a lift valve disposed between the hydraulic pump and the lift cylinder 14, and a tilt valve disposed between the hydraulic pump and the tilt cylinder 15.

The electronic control unit 22 is constituted by a microcomputer including a CPU, a RAM, a ROM, an input/output interface, and the like. The electronic control unit 22 includes a storage unit 27, a parameter calculation unit 28, a center of gravity calculation unit 29, and a control unit 30.

The storage unit 27, the parameter calculation unit 28, and the center of gravity calculation unit 29 constitute an estimation calculation unit that performs estimation calculation of the center of gravity of the cargo W loaded on the fork 13 using the pressure on the rod side of the tilt cylinder 15, the pressure on the bottom side of the tilt cylinder 15, the pressure of the lift cylinder 14, and data on a structure of the cargo handling device 3. That is, a part of the electronic control unit 22 functions as the estimation calculation unit.

The storage unit 27 stores data on the structure of the cargo handling device 3 including the lift cylinder 14 and the tilt cylinder 15, and expressions for performing the estimation calculation of the center of gravity of the cargo W. As a structure of the lift cylinder 14, a dimension, a weight, a position, and the like of the lift cylinder 14 can be exemplified. As a structure of the tilt cylinder 15, a dimension, a weight, a position, a posture, and the like of the tilt cylinder 15 can be exemplified. As other structures of the cargo handling device 3, a dimension, a weight, a position, center-of-gravity coordinates, and the like of each component of the cargo handling device 3 such as the mast 11 and the fork 13 can be exemplified.

The parameter calculation unit 28 calculates parameters of a linear expression related to a rotational moment around the mast support 10 (see FIG. 4) on the basis of the pressures on the rod side and the bottom side of the tilt cylinder 15 detected by the tilt cylinder pressure sensors 17 and 18, the pressure of the lift cylinder 14 detected by the lift cylinder pressure sensor 19, the tilt angle of the mast 11 detected by the angle sensor 20, the height of the fork 13 detected by the distance sensor 21, and the data on the structure of the cargo handling device 3.

The center of gravity calculation unit 29 calculates center-of-gravity estimated values of the cargo W in a front-rear direction and a height direction of the vehicle body 4 on the basis of the parameters of the linear expression calculated by the parameter calculation unit 28, the data on the structure of the cargo handling device 3, the tilt angle of the mast 11, and the height of the fork 13.

The control unit 30 controls the display 23, the travel motor 7, and the hydraulic drive unit 24 on the basis of the center-of-gravity estimated values of the cargo W in the front-rear direction and the height direction of the vehicle body 4 calculated by the center of gravity calculation unit 29.

In the above description, the tilt cylinder pressure sensors 17 and 18, the lift cylinder pressure sensor 19, the angle sensor 20, the distance sensor 21, and the electronic control unit 22 including the storage unit 27, the parameter calculation unit 28, and the center of gravity calculation unit 29 constitute a center of gravity estimation device 31 of the present embodiment.

An outline of a method for estimating the center of gravity of the cargo W loaded on the fork 13 in such a center of gravity estimation device 31 will be described. As illustrated in FIG. 4, the mast 11 is supported by the tilt cylinder 15 and is rotatable with a point called the mast support 10 as a fulcrum. Therefore, when the rotational moment around the mast support 10 is taken into account, the following expression is established. In FIG. 4, an X direction is a front-rear direction of the vehicle body 4, and a Z direction is a height direction (vertical direction) of the vehicle body 4.

$$F{tilt} \times L{tilt} = Fw \times Lw + Fm \times Lm \tag{1}$$

Ftilt is a load applied in an axial direction of the tilt cylinder 15. Ltilt is a distance between an axis of the tilt cylinder 15 and the mast support 10. Specifically, Ltilt is a distance from the mast support 10 to an intersection point of a straight line passing through the mast support 10 and perpendicular to the axis of the tilt cylinder 15 and the axis of the tilt cylinder 15.

Fw is a load applied to the cargo W. Lw is an arm length of a component perpendicular to the load Fw that is applied to the cargo W and is equivalent to an absolute value of an X coordinate with the mast support 10 as an origin. Specifically, Lw is a distance between a virtual line S1 passing through the center of gravity of the cargo W and extending in a height direction of the vehicle body 4 and the mast support 10.

Fm is a load applied to a combined center of gravity of the cargo handling device 3 including the mast 11 and the fork 13. Lm is an arm length of a component perpendicular to the load Fm that is applied to the combined center of gravity of the cargo handling device 3, and is equivalent to an absolute value of an X coordinate with the mast support 10 as the origin. Specifically, Lm is a distance between a virtual line S2 passing through the combined center of gravity of the cargo handling device 3 and extending in the height direction of the vehicle body 4 and the mast support 10.

Ftilt, Ltilt, Fw, Lw, Fm, and Lm as described above are parameters of the linear expression related to the rotational moment around the mast support 10. In expression (1) described above, the only unknown value is Lw.

Ftilt can be calculated from detected values of the tilt cylinder pressure sensors 17 and 18. Ltilt can be geometrically calculated from the structure of the cargo handling device 3. Fw can be calculated from a detected value of the lift cylinder pressure sensor 19. Fm can be calculated by taking the tilt angle and the cargo handling height into account with respect to the value geometrically calculated from the structure of the cargo handling device 3. Lm can be calculated by taking the tilt angle and the cargo handling height into account with respect to the value geometrically calculated from the structure of the cargo handling device 3.

Lw is an X coordinate of the center of gravity of the cargo W with the mast support 10 as the origin. When the mast 11 is tilted from a state in which it stands perpendicular to the ground, Lw is a value in which an initial X coordinate component, an initial Z coordinate component, and a tilt angle of the mast 11 are contained on the basis of a rotation formula. When it is assumed that coordinates of an initial center of gravity of the cargo W in a state in which the mast 11 stands vertically are (Xini, Zini), coordinates of the center of gravity of the cargo W after the mast 11 is tilted from the vertically standing state are (Xrot, Zrot), and the tilt angle is θ, the following expressions are obtained.

$$Lw = Xrot = Xini \times \cos\theta - Zini \times \sin\theta$$

$$Zrot = Xini \times \sin\theta + Zini \times \cos\theta$$

Two unknown values are included in Lw. Therefore, the coordinates of the initial center of gravity of the cargo W can be calculated by obtaining coefficients of the linear expressions in two states with different tilt angles θ and solving simultaneous expressions of the linear expressions of the two states.

Figure 5:
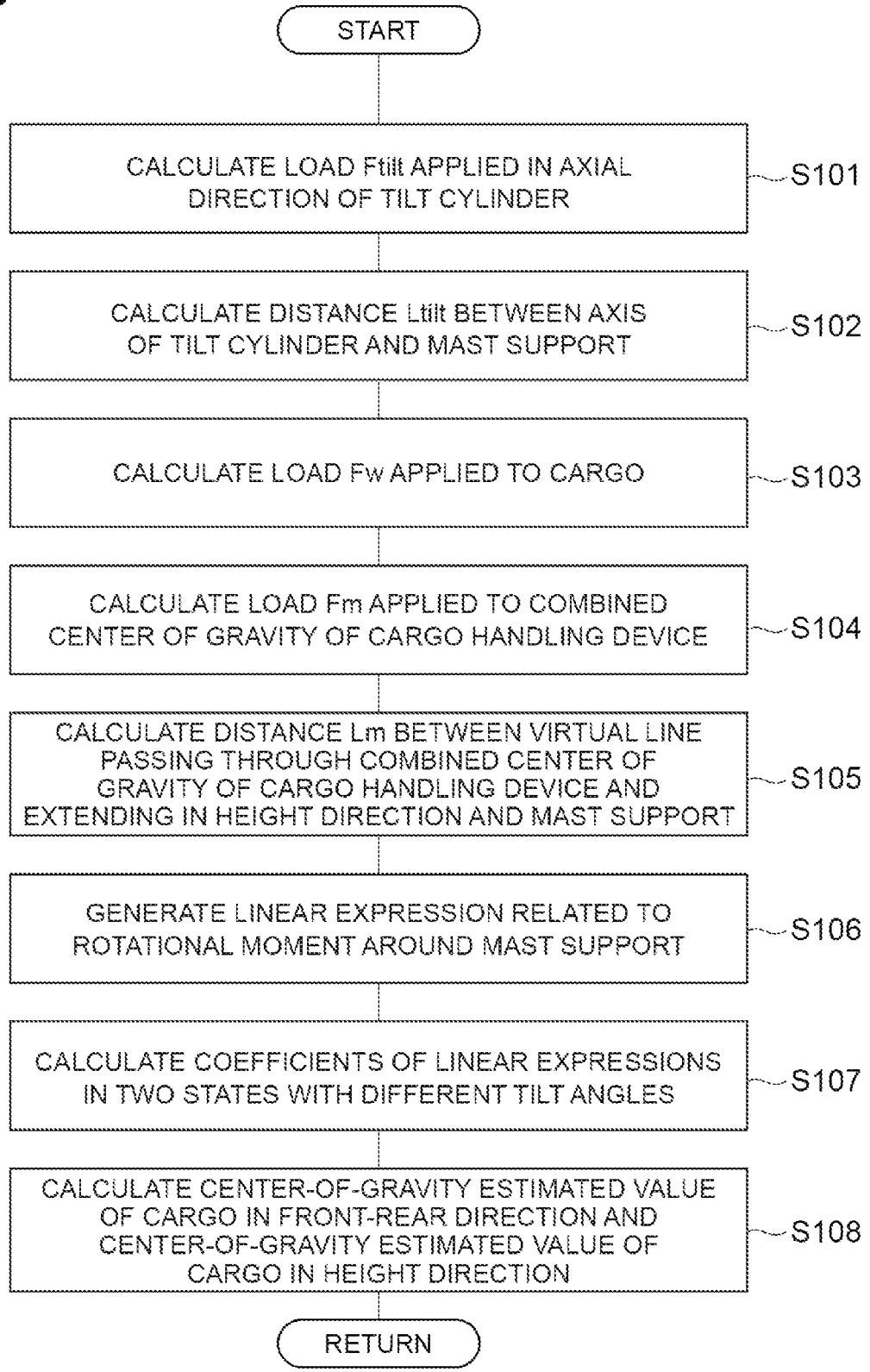
FIG. 5 is a flowchart showing a procedure of calculation processing executed by a parameter calculation unit and a center of gravity calculation unit shown in FIG. 2.

FIG. 5 is a flowchart showing a procedure of calculation processing executed by the parameter calculation unit 28 and the center of gravity calculation unit 29. Further, this processing is executed, for example, at predetermined time intervals after a start switch of the forklift 1 is turned on.

In FIG. 5, the parameter calculation unit 28 first calculates the load Ftilt applied in the axial direction of the tilt cylinder 15 on the basis of the pressure on the rod side of the tilt cylinder 15, the pressure on the bottom side of the tilt cylinder 15, and the data on the structure of the tilt cylinder 15 (step S101). The load Ftilt applied in the axial direction of the tilt cylinder 15 is calculated by the following expression.

$$Ftilt = (Prod \times Srod - Pbtm \times Sbtm) \times K \quad (2)$$

Prod is the pressure on the rod side of the tilt cylinder 15 and is obtained from a detected value of the tilt cylinder pressure sensor 17. Srod is a pressure receiving area on the rod side of the tilt cylinder 15 and is calculated by the following expression. As illustrated in FIG. 3, Φcyl is a cylinder inner diameter of the tilt cylinder 15. Φprod is a rod diameter of the tilt cylinder 15.

$$Srod = (\Phi cyl/2) \times (\Phi cyl/2) \times \pi - (\Phi rod/2) \times (\Phi rod/2) \times \pi$$

Pbtm is the pressure on the bottom side of the tilt cylinder 15 and is obtained from a detected value of the tilt cylinder pressure sensor 18. Sbtm is a pressure receiving area on the bottom side of the tilt cylinder 15 and is calculated by the following expression.

$$Sbtm = (\Phi cyl/2) \times (\Phi cyl/2) \times \pi$$

K is a load pressure coefficient and is substantially 0.85 to 1.00. Further, expression (2), Srod, Sbtm, and K are stored in advance in the storage unit 27.

Next, the parameter calculation unit 28 calculates the distance Ltilt between the axis of the tilt cylinder 15 and the mast support 10 on the basis of the tilt angle and the data on the structure of the tilt cylinder 15 (step S102).

Figure 6:
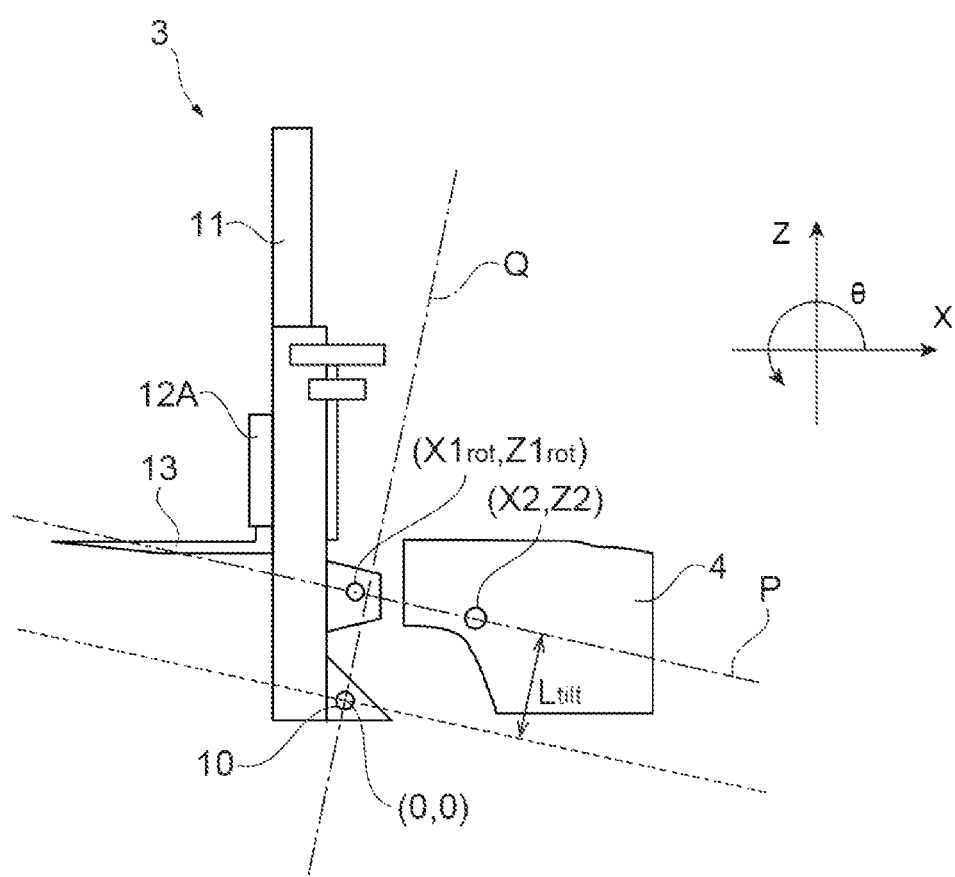
FIG. 6 is a conceptual view illustrating an XZ coordinate system of the cargo handling device when a distance between an axis of the tilt cylinder and the mast support is calculated.

In calculating the distance Ltilt between the axis of the tilt cylinder 15 and the mast support 10, coordinates are defined as follows as illustrated in FIG. 6. It is assumed that the mast 11 is in a state of standing perpendicular to the ground when the tilt angle is 0 degrees.

(X1 ini, Z1 ini): a fulcrum of the tilt cylinder 15 on the mast 11 side with the tilt angle being 0 degrees (X2, Z2): a fulcrum of the tilt cylinder 15 on the vehicle body 4 side (0, 0): Origin (the mast support 10)

(X1rot, Z1rot): a fulcrum of the tilt cylinder 15 on the mast 11 side after tilting According to the rotation formula, the fulcrum of the tilt cylinder 15 on the mast 11 side after the mast 11 is tilted (after tilting) from the state of standing perpendicular to the ground is calculated by the following expression.

$$X1rot = X1ini \times \cos\theta - Z1ini \times \sin\theta \quad (3)$$

$$Z1rot = X1ini \times \sin\theta + Z1ini \times \cos\theta \quad (4)$$

When it is assumed that a linear expression P passing through the two coordinates of (X1rot, Z1rot) and (X2, Z2) is Z=aX+b, the tilt a and the intercept b are represented as follows.

$$a = (Z1rot - Z2)/(X1rot - X2) \quad (5)$$

$$b = -\{(Z1rot - Z2)/(X1rot - X2)\} \times X1rot + Z1rot \quad (6)$$

When it is assumed that a linear expression Q that passes through the mast support 10 and is perpendicular to the axis of the tilt cylinder 15 (linear expression P) is Z=cX+d, the tilt c and the intercept d are represented as follows.

$$c = \pi/2 - [ATAN\{(Z1rot - Z2)/(X1rot - X2)\}] \quad (7)$$

$$d = 0 \quad (8)$$

From expressions (3) to (8), intersection coordinates (Xcross, Zcross) between the linear expression P and the linear expression Q are represented as follows.

$$Xcross = (d-b)/(a-c) \quad (9)$$

$$Zcross = c \times Xcross \quad (10)$$

Then, from expressions (9) and (10), the distance Ltilt between the axis of the tilt cylinder 15 and the mast support 10 is calculated by the following expression.

$$Ltilt = \sqrt{(Xcross^2 + Zcross^2)} \quad (11)$$

Further, (X1ini, Z1ini), (X2, Z2) and expressions (3) to (11) are stored in advance in the storage unit 27.

Next, the parameter calculation unit 28 calculates the load Fw applied to the cargo W on the basis of the pressure of the lift cylinder 14 and data on the structure of the lift cylinder 14 (step S103). The load Fw applied to the cargo W is represented by the following expression.

$$Fw = Mw \times G \quad (12)$$

Mw is a weight of the cargo W and is calculated from the pressure of the lift cylinder 14, the number of lift cylinders 14, and a pressure receiving area of the lift cylinder 14. G is a gravitational acceleration. Further, the pressure receiving area of the lift cylinder 14 and expression (12) are stored in advance in the storage unit 27.

Next, the parameter calculation unit 28 calculates the load Fm applied to the combined center of gravity of the cargo handling device 3 including the mast 11 and the fork 13 on the basis of the data on the structure of the cargo handling device 3 (step S104).

In calculating the load Fm applied to the combined center of gravity of the cargo handling device 3, data of the cargo handling device 3 at the time of designing the forklift 1 may be used, or data measured for each component of the cargo handling device 3 may be integrated and used.

Next, the parameter calculation unit 28 calculates the distance Lm between the virtual line S2 (see FIG. 4) passing through the combined center of gravity of the cargo handling device 3 and extending in the height direction of the vehicle body 4 and the mast support 10 on the basis of the tilt angle and the data on the structure of the cargo handling device 3 (step S105).

In calculating the distance Lm, as in step S104, data of the cargo handling device 3 at the time of designing the forklift 1 may be used, or data measured for each component of the cargo handling device 3 may be integrated and used.

When the data measured for each component of the cargo handling device 3 is used, combined center-of-gravity coordinates (Xmast_total, Zmast_total) of the cargo handling device 3 including the mast 11 and the fork 13 when a cargo handling height, a free lift amount, and an amount of height movement for each component depending on the cargo handling height are taken into account are calculated as follows. Further, Mn is a weight of each component. Xn is a distance of an X coordinate component of each component from the mast support 10. Zn is a distance of a Z coordinate component of each component from the mast support 10.

$$X\text{mast\_total}=(X1*M1+X2*M2+\ldots+Xn*Mn)/(M1+M2+\ldots+Mn) \quad (13)$$

$$Z\text{mast\_total}=(Z1*M1+Z2*M2+\ldots+Zn*Mn)/(M1+M2+\ldots+Mn) \quad (14)$$

Further, the combined center-of-gravity coordinates (Xmast_total_tilt, Zmast_total_tilt) of the cargo handling device 3 after tilting are calculated as follows by the rotation formula.

$$Lm=X\text{mast\_total\_tilt}=X\text{mast\_total}*\cos\theta-Z\text{mast\_total}*\sin\theta$$

$$Z\text{mast\_total\_tilt}=X\text{mast\_total}*\sin\theta+Z\text{mast\_total}*\cos\theta \quad (15)$$

In this case, Mn, Xn, Zn, and expressions (13) to (15) are stored in advance in the storage unit 27.

After steps S101 to S105 are executed, the center of gravity calculation unit 29 generates a linear expression related to the rotational moment around the mast support 10 on the basis of the tilt angle, the cargo handling height, and the data on the structure of the cargo handling device 3 (step S106).

Center-of-gravity coordinates (Lw, Zw) of the cargo W at the time of a state in which the mast 11 stands perpendicular to the ground are calculated by the following expression. The center-of-gravity coordinates (Lw, Zw) are coordinates with the mast support 10 as the origin.

$$Lw=Xoh+X1c$$

$$Zw=\text{Height}+Z\text{high}-Z\text{offset}$$

Figure 7:
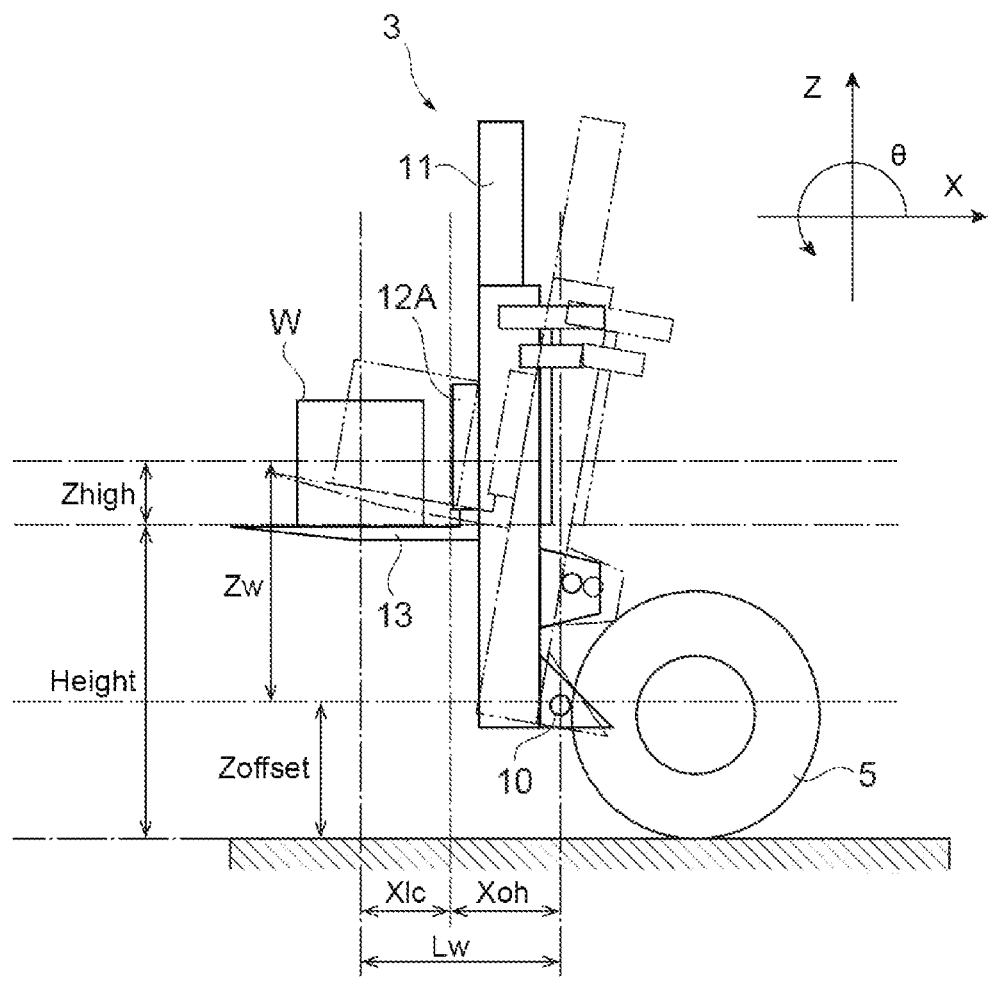
FIG. 7 is a conceptual view illustrating a positional relationship of each component of the cargo handling device when a center-of-gravity estimated value of a cargo is calculated.

As illustrated in FIG. 7, Xoh is a distance (X coordinate component) from the mast support 10 to a front-end surface of a backrest 12A. X1c is a distance (X coordinate component) from the front-end surface of the backrest 12A to the center of gravity of the cargo W. Height is a distance (cargo handling height) from the ground to a loading surface of the fork 13. Zhigh is a distance (Z coordinate component) from the loading surface of the fork 13 to the center of gravity of the cargo W. Zoffset is a distance (Z coordinate component) from the ground to the mast support 10.

Center-of-gravity coordinates (Lw, Zw) of the cargo W after the mast 11 is tilted from the vertically standing state are calculated by the following expression.

$$Lw=(Xoh+X1c)\cos\theta-(\text{Height}+Z\text{high}-Z\text{offset})\sin\theta \quad (16)$$

$$Zw=(Xoh+X1c)\sin\theta+(\text{Height}+Z\text{high}-Z\text{offset})\cos\theta$$

When expressions (2) to (16) described above are substituted into expression (1) described above, the following expression can be obtained.

$$F\text{tilt}\times L\text{tilt}=Fw\times\{(Xoh+X1c)\cos\theta-(\text{Height}+Z\text{high}-Z\text{offset})\sin\theta\}+Fm\times Lm \quad (17)$$

Expression (17) is a linear expression with two unknowns. The unknowns are X1c and Zhigh. When expression (17) is transformed into a form of aX+bZ+c=0 (X and Z are unknowns), it is represented by the following expression.

$$(F\text{tilt}\times L\text{tilt}-Fm\times Lm)/Fw=(Xoh+X1c)\cos\theta-(\text{Height}+Z\text{high}-Z\text{offset})\sin\theta \quad (18)$$

When expression (18) is transformed, $$X1c*\cos\theta-Z\text{high}*\sin\theta+Xoh*\cos\theta-(\text{Height}-Z\text{offset})\sin\theta-(F\text{tilt}\times L\text{tilt}-Fm\times Lm)/Fw=0 \quad (19)$$

a=cos θ
b=−sin θ
c=Xoh*cos θ−(Height−Zoffset)sin θ−(Ftilt×Ltilt−Fm×Lm)/Fw

Expression (19) is a linear expression related to the rotational moment around the mast support 10. Ftilt, Ltilt, Fw, Fm, and Lm are parameters of the linear expression. a, b, and c are coefficients of the linear expression. Further, expression (19) and expressions of the coefficients a, b, and c are stored in advance in the storage unit 27.

Next, the center of gravity calculation unit 29 obtains the coefficients a, b, and c of the linear expressions in two states with different tilt angles (step S107). At this time, coefficients of a first state are a1, b1, and c1, and coefficients of a second state are a2, b2, and c2.

Next, the center of gravity calculation unit 29 calculates the center-of-gravity estimated values of the cargo W in the front-rear direction and the height direction of the vehicle body 4 using the coefficients a, b, and c of the linear expressions of the two states with different tilt angles (step S108).

The center-of-gravity estimated value of the cargo W in the front-rear direction of the vehicle body 4 (hereinafter, center-of-gravity estimated value of the cargo W in the front-rear direction) is calculated as the distance (X coordinate component) X1c from the front-end surface of the backrest 12A. The center-of-gravity estimated value of the cargo W in the height direction of the vehicle body 4 (hereinafter, center-of-gravity estimated value of the cargo W in the height direction) is calculated as the distance (Z coordinate component) Zhigh from the loading surface of the fork 13. Specifically, X1c and Zhigh are calculated by solving the following two simultaneous expressions.

$$a1*X1c+b1*Zhigh+c1=0$$

$$a2*X1c+b2*Zhigh+c2=0$$

Figure 8:
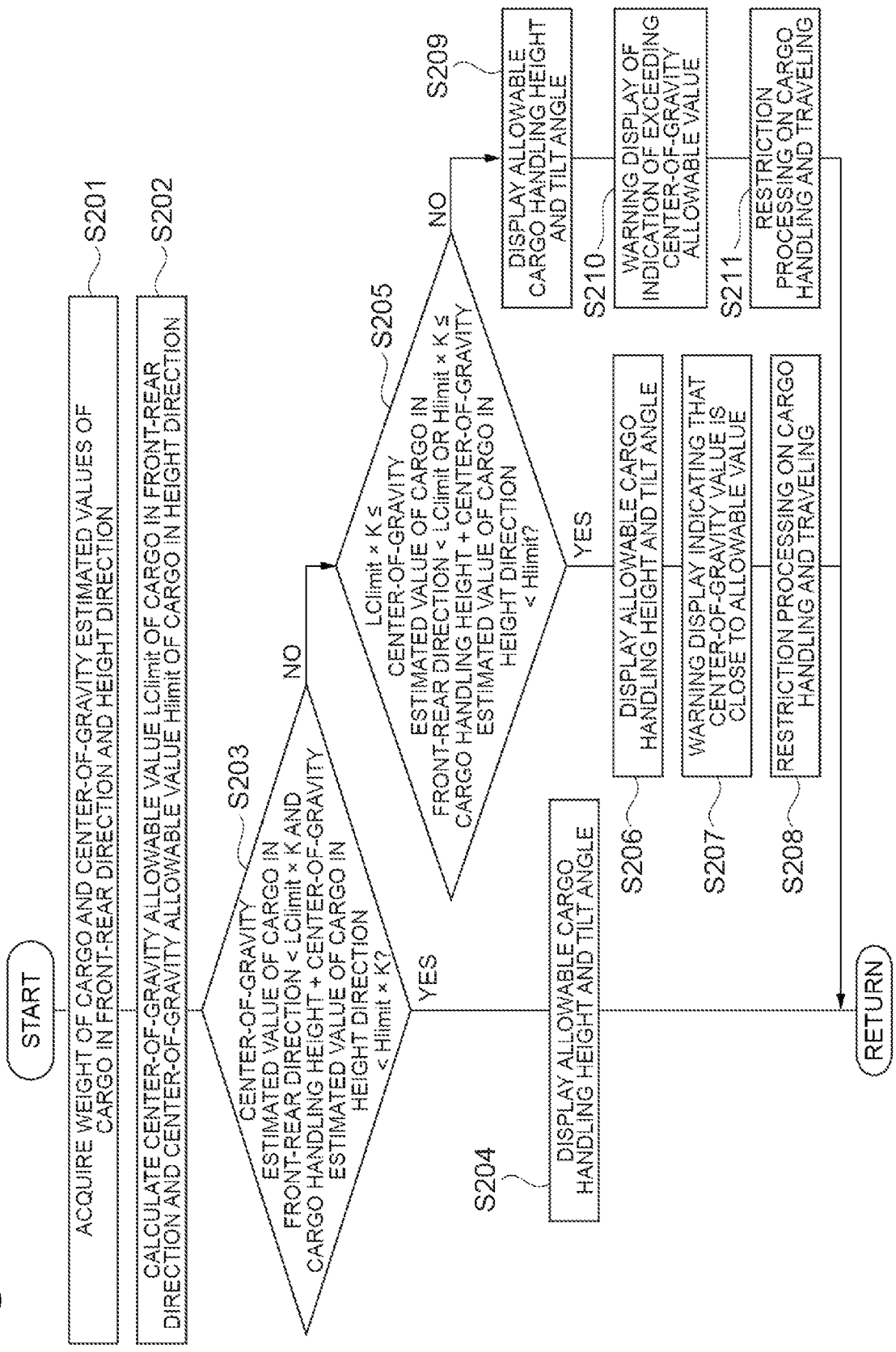
FIG. 8 is a flowchart showing a procedure of control processing executed by a control unit shown in FIG. 2.

FIG. 8 is a flowchart showing a procedure of control processing executed by the control unit 30. Further, this processing is executed, for example, at predetermined time intervals after the start switch of the forklift 1 is turned on.

In FIG. 8, the control unit 30 first acquires the weight of the cargo W calculated by the parameter calculation unit 28 and the center-of-gravity estimated values of the cargo W in the front-rear direction and the height direction calculated by the center of gravity calculation unit 29 (step S201).

Next, the control unit 30 calculates a center-of-gravity allowable value LClimit of the cargo W in the front-rear direction and a center-of-gravity allowable value Hlimit of the cargo W in the height direction using a load table prepared in advance (step S202). The center-of-gravity allowable value LClimit of the cargo W in the front-rear direction is calculated from the weight Mw of the cargo W and the center-of-gravity estimated value X1c of the cargo W in the front-rear direction. The center-of-gravity allowable value Hlimit of the cargo W in the height direction is calculated from the weight Mw of the cargo W and the center-of-gravity estimated value Zhigh of the cargo W in the height direction.

Next, the control unit 30 determines whether or not the center-of-gravity estimated value X1c of the cargo W in the front-rear direction is less than (the center-of-gravity allowable value LClimit×K) and a cargo handling height Height (see FIG. 7)+the center-of-gravity estimated value Zhigh of the cargo W in the height direction is less than (the center-of-gravity allowable value Hlimit×K) (step S203). K is a constant that is less than 1. When the condition of step S203 is satisfied, the control unit 30 causes the display 23 to display the allowable cargo handling height and tilt angle (step S204).

When the condition of step S203 is not satisfied, the control unit 30 determines whether or not the center-of-gravity estimated value X1c of the cargo W in the front-rear direction is equal to or greater than (the center-of-gravity allowable value LClimit×K) and less than the center-of-gravity allowable value LClimit or the cargo handling height Height+the center-of-gravity estimated value Zhigh of the cargo W in the height direction is equal to or greater than (the center-of-gravity allowable value Hlimit×K) and less than the center-of-gravity allowable value Hlimit (step S205).

When the condition of step S205 is satisfied, the control unit 30 causes the display 23 to display the allowable cargo handling height and tilt angle (step S206). Then, the control unit 30 causes the display 23 to display a warning indicating that the center-of-gravity estimated value of the cargo W is in a state close to the center-of-gravity allowable value (step S207). At this time, the control unit 30 may cause the display 23 to generate warning sound.

Also, the control unit 30 controls the travel motor 7 and the hydraulic drive unit 24 to perform a restriction on cargo handling and traveling (step S208). For example, the control unit 30 controls the travel motor 7 to restrict a traveling acceleration at the time of acceleration, a traveling deceleration at the time of deceleration, and a traveling speed at the time of turning. Also, the control unit 30 controls the hydraulic drive unit 24 to restrict acceleration and deceleration when the cargo is raised, acceleration and deceleration when the cargo is lowered, acceleration and deceleration when the mast 11 is tilted forward and backward, and a cargo handling height when the cargo is raised.

When the condition of step S205 is not satisfied, specifically when the center-of-gravity estimated value X1c of the cargo W in the front-rear direction is determined to be equal to or greater than the center-of-gravity allowable value LClimit or the cargo handling height Height+the center-of-gravity estimated value Zhigh of the cargo W in the height direction is determined to be equal to or greater than the center-of-gravity allowable value Hlimit, the control unit 30 causes the display to display the allowable cargo handling height and tilt angle (step S209). Then, the control unit 30 causes the display 23 to display a warning indicating that the center-of-gravity estimated value of the cargo W has exceeded the center-of-gravity allowable value (step S210). At this time, the control unit 30 may cause the display 23 to generate louder warning sound than that when step S207 is executed.

Also, the control unit 30 controls the travel motor 7 and the hydraulic drive unit 24 to perform restriction on cargo handling and traveling (step S211). For example, the control unit 30 may control the travel motor 7 to prohibit forward movement and rearward movement. Also, the control unit 30 controls the hydraulic drive unit 24 to prohibit raising operation of the cargo W and forward tilting operation of the mast 11 or restrict acceleration and deceleration when the cargo is lowered.

Further, in step S203 described above, the control unit 30 may determine whether or not the center-of-gravity estimated value X1c of the cargo W in the front-rear direction is less than (the center-of-gravity allowable value LClimit× K) or the cargo handling height Height+the center-of-gravity estimated value Zhigh of the cargo W in the height direction is less than (the center-of-gravity allowable value Hlimit× K).

As described above, in the present embodiment, the estimation calculation of the center of gravity of the cargo W loaded on the fork 13 is performed by detecting the pressures on the rod side and the bottom side of the tilt cylinder 15 and the pressure of the lift cylinder 14, and using these detected values and the data on the structure of the cargo handling device 3. Therefore, a position of the center of gravity of the cargo W loaded on the fork 13 can be estimated. Also, since work for acquiring correlation data for each model of the forklift 1 in advance by measurement or the like is not necessary, the center of gravity estimation device 31 having high versatility can be realized.

Also, in the present embodiment, the positions of the center of gravity of the cargo W in the front-rear direction and the height direction of the vehicle body 4 can be estimated by detecting the tilt angle of the mast 11 and the height of the fork 13 and performing the estimation calculation of the center of gravity of the cargo W using the parameters of the linear expression related to the rotational moment around the mast support 10, the data on the structure of the cargo handling device 3, the tilt angle of the mast 11, and the height of the fork 13.

Further, in the present embodiment, since the simultaneous expressions of the linear expressions in two states with different tilt angles of the mast 11 are used, the center-of-gravity estimated values of the cargo W in the front-rear direction and the height direction of the vehicle body 4 can be easily calculated.

Also, in the present embodiment, since a simple expression including the load applied in the axial direction of the tilt cylinder 15, the load applied to the cargo W, and the load applied to the combined center of gravity of the cargo handling device 3 as some of the parameters is used as the linear expression related to the rotational moment around the mast support 10, a time for the estimation calculation of the center of gravity of the cargo W can be reduced.

Also, in the present embodiment, the parameters of the linear expression related to the rotational moment around the mast support 10 can be easily calculated.

Figure 9:
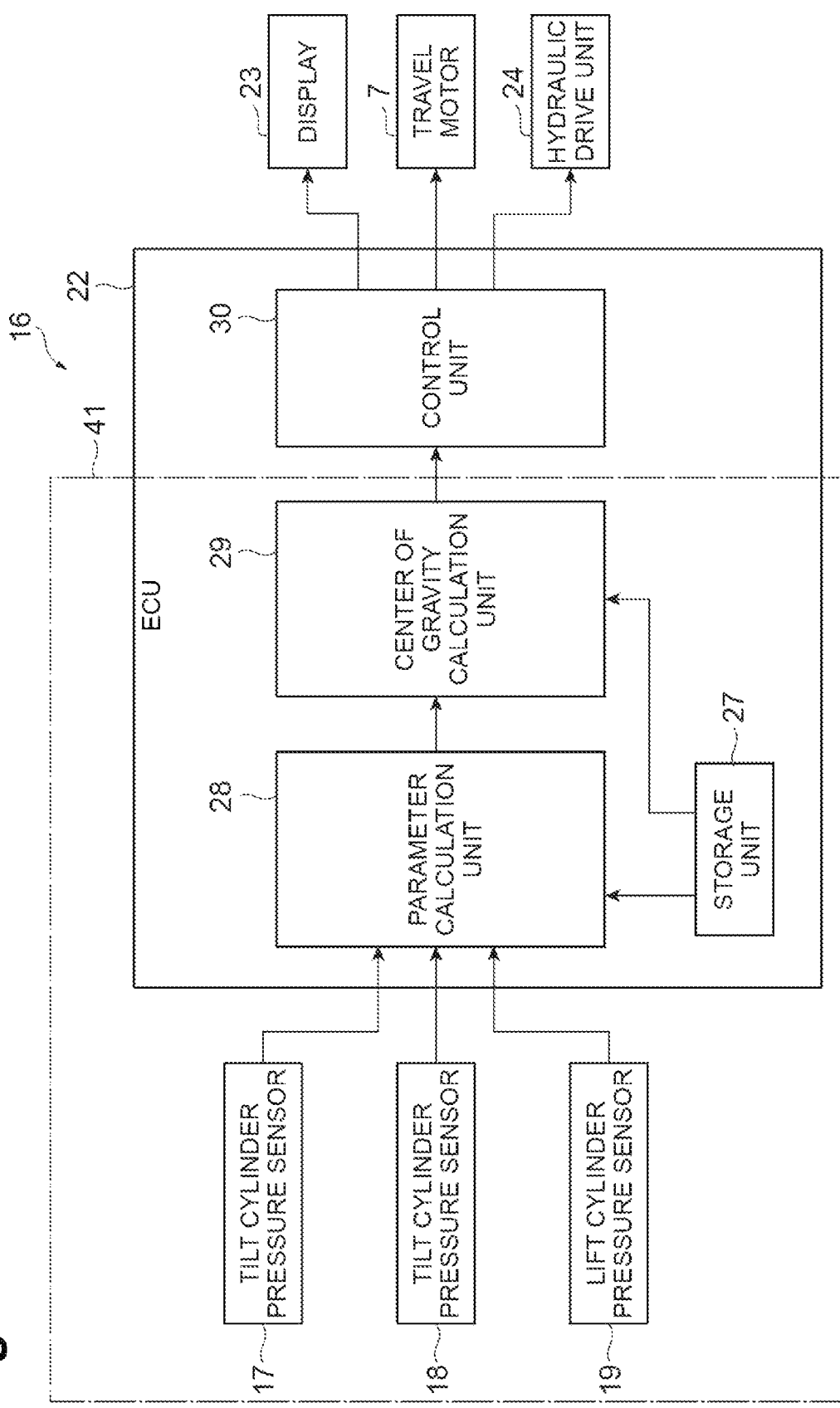
FIG. 9 is a block diagram showing a configuration of a vehicle control device including a center of gravity estimation device according to a second embodiment of the present disclosure.

FIG. 9 is a block diagram showing a configuration of a vehicle control device having a center of gravity estimation device according to a second embodiment of the present disclosure. In FIG. 9, a vehicle control device 16 is different from that of the first embodiment in that it does not include the angle sensor 20 and the distance sensor 21. An electronic control unit 22 includes a storage unit 27, a parameter calculation unit 28, a center of gravity calculation unit 29, and a control unit 30 as in the first embodiment described above.

The parameter calculation unit 28 calculates parameters of a linear expression related to a rotational moment around a mast support 10 on the basis of pressures on a rod side and a bottom side of a tilt cylinder 15 detected by tilt cylinder pressure sensors 17 and 18, a pressure of a lift cylinder 14 detected by a lift cylinder pressure sensor 19, and data on a structure of a cargo handling device 3.

The center of gravity calculation unit 29 calculates a center-of-gravity estimated value of cargo W in a front-rear direction of the vehicle body 4 on the basis of the parameters of the linear expression calculated by the parameter calculation unit 28 and the data on the structure of the cargo handling device 3.

The control unit 30 controls a display 23, a travel motor 7, and a hydraulic drive unit 24 on the basis of the center-of-gravity estimated value of the cargo W in the front-rear direction of the vehicle body 4 calculated by the center of gravity calculation unit 29.

In the above description, the tilt cylinder pressure sensors 17 and 18, the lift cylinder pressure sensor 19, and the electronic control unit 22 including the storage unit 27, the parameter calculation unit 28, and the center of gravity calculation unit 29 constitute a center of gravity estimation device 41 of the present embodiment.

FIG. 10 is a flowchart showing a procedure of calculation processing executed by the parameter calculation unit 28 and the center of gravity calculation unit 29, and is a diagram corresponding to FIG. 5. In FIG. 10, the parameter calculation unit 28 executes steps S101 to S105 as in the first embodiment described above.

In step S102, the parameter calculation unit 28 calculates a distance Ltilt between an axis of the tilt cylinder 15 and the mast support 10 on the assumption that the mast 11 lifts the cargo W in a state of standing perpendicular to the ground. In a state in which the mast 11 stands perpendicular to the ground, cos θ=1 and sin θ=0. Therefore, expressions (3) and (4) described above are as follows.

$$X1rot = X1ini$$

$$Z1rot = Z1ini$$

In step S105, the parameter calculation unit 28 calculates a distance Lm between a virtual line S2 passing through a combined center of gravity of the cargo handling device 3 and extending in a height direction of the vehicle body 4 and the mast support 10 on the assumption that the mast 11 lifts the cargo W in a state of standing perpendicular to the ground. At this time, since cos θ=1 and sin θ=0, expression (15) described above is as follows.

$$Lm = X\text{mast\_total\_tilt} = X\text{mast\_total}$$

After steps S101 to S105 are executed, the center of gravity calculation unit 29 generates a linear expression related to a rotational moment around the mast support 10 (step S111). As described above, since cos θ=1 and sin θ=0, expression (18) described above is simplified as following expression.

$$(F\text{tilt} \times L\text{tilt} - Fm \times Lm)/Fw = Xoh + X1c \quad (20)$$

Next, the center of gravity calculation unit 29 calculates the center-of-gravity estimated value of the cargo W in the front-rear direction of the vehicle body 4 (center-of-gravity estimated value of the cargo W in the front-rear direction) (step S112). Specifically, when expression (20) is summarized for X1c, the following expression is established.

$$X1c = \{(F\text{tilt} \times L\text{tilt} - Fm \times Lm)/Fw\} - Xoh$$

Although a procedure of control processing executed by the control unit 30 is not particularly shown, the control unit 30 uses a center-of-gravity allowable value LClimit (described above) of the cargo W in the front-rear direction to compare a center-of-gravity estimated value X1c of the cargo W in the front-rear direction with LClimit×K and LClimit, and according to the result, the control unit 30 controls the display 23, the travel motor 7, and the hydraulic drive unit 24.

In the present embodiment described above, the pressures on the rod side and the bottom side of the tilt cylinder 15 and the pressure on the lift cylinder 14 are detected, and these detected values and the data on the structure of the cargo handling device 3 are used to perform estimation calculation of the center of gravity of the cargo W loaded on the fork 13. Therefore, a position of the center of gravity of the cargo W loaded on the fork 13 can be estimated. Also, since work for acquiring correlation data for each model of the forklift 1 in advance by measurement or the like is not necessary, the center of gravity estimation device 41 having high versatility can be realized.

Also, in the present embodiment, when it is assumed that the mast 11 stands perpendicular to the ground, the position of the center of gravity of the cargo W in the front-rear direction of the vehicle body 4 can be estimated by performing the estimation calculation of the center of gravity of the cargo W using the parameters of the linear expression related to the rotational moment around the mast support 10 and the data on the structure of the cargo handling device 3. Since only the position of the center of gravity of the cargo W in the front-rear direction of the vehicle body 4 is estimated as described above, a time for the estimation calculation of the center of gravity of the cargo W can be reduced.

Further, the present disclosure is not limited to the above-described embodiments. For example, in the second embodiment described above, the distance Lm between the virtual line S2 passing through the combined center of gravity of the cargo handling device 3 and extending in a height direction of the vehicle body 4 and the mast support 10 may be calculated by providing the angle sensor 20 for detecting the tilt angle and using expression (15) described above. In this case, a calculation accuracy of the distance Lm can be improved, and thus an estimation accuracy of the center of gravity of the cargo W in the front-rear direction can be improved.

Also, in the first embodiment described above, coefficients of the linear expressions in two states with different tilt angles are obtained and simultaneous expressions of the linear expressions of the two states are solved to calculate the center-of-gravity estimated value X1c of the cargo W in the front-rear direction and the center-of-gravity estimated value Zhigh of the cargo W in the height direction, but the present disclosure is not particularly limited to the form.

For example, the center-of-gravity estimated value Zhigh of the cargo W in the height direction may be calculated by substituting the calculated center-of-gravity estimated value X1c of the cargo W in the front-rear direction calculated in the second embodiment into expression (18) described above in another state in which the tilt angle is different. That is, after the center-of-gravity estimated value of the cargo W in the front-rear direction of the vehicle body 4 is calculated on the basis of the parameters of the linear expression and the data on the structure of the cargo handling device 3, the center-of-gravity estimated value of the cargo W in the height direction of the vehicle body 4 may be calculated on the basis of the parameters of the linear expression, the data on the structure of the cargo handling device 3, and the center-of-gravity estimated value of the cargo W in the front-rear direction of the vehicle body 4. In this case, since an amount of calculation of the center of gravity calculation unit 29 is small, an inexpensive microcomputer can be used for the electronic control unit 22, and thus costs of the electronic control unit 22 can be reduced.

Also, in the above-described embodiment, the distance X1c from the front-end surface of the backrest 12A to the center of gravity of the cargo W is used as the center-of-gravity estimated value of the cargo W in the front-rear direction and the distance Zhigh from the loading surface of the fork 13 to the center of gravity of the cargo W is also used as the center-of-gravity estimated value of the cargo W in the height direction, but the present disclosure is not particularly limited to the form, and the distance Lw from the mast support 10 to the center of gravity of the cargo W may be used as the center-of-gravity estimated value of the cargo W in the front-rear direction and the distance Zw from the mast support 10 to the center of gravity of the cargo W may be used as the center-of-gravity estimated value of the cargo W in the height direction.

Also, although the center of gravity estimation device of the above-described embodiment is applied to the battery-type forklift 1 in which the front wheels 5 serving as driving wheels are rotated by the travel motor 7, the present disclosure is also applicable to an engine-type forklift in which drive wheels are rotated by an engine.

Also, although the center of gravity estimation device of the above-described embodiment is mounted on the forklift 1 equipped with the fork 13 on which the cargo W is loaded, the present disclosure is also applicable to cargo handling vehicles such as forklifts equipped with other attachments on which the cargo W is loaded.

REFERENCE SIGNS LIST

1 Forklift (cargo handling vehicle),
3 Cargo handling device
4 Vehicle body
10 Mast support
11 Mast
13 Fork (loading part)
14 Lift cylinder
15 Tilt cylinder
17 Tilt cylinder pressure sensor (first pressure detection unit)
18 Tilt cylinder pressure sensor (second pressure detection unit)
19 Lift cylinder pressure sensor (Third pressure detection unit)
20 Angle sensor (angle detection unit)
21 Distance sensor (height detection unit)
22 Electronic control unit (estimation calculation unit)
27 Storage unit (estimation calculation unit)
28 Parameter calculation unit (estimation calculation unit)
29 Center of gravity calculation unit (estimation calculation unit)
31 Center of gravity estimation device
41 Center of gravity estimation device
S2 Virtual line
W Cargo

The invention claimed is:

1. A center of gravity estimation device of a cargo handling vehicle equipped with a cargo handling device rotatably connected to a front-end portion of a vehicle body via a mast support and including a lift cylinder which raises and lowers a loading part attached to a mast and a tilt cylinder which tilts the mast, the center of gravity estimation device of a cargo handling vehicle comprising:
   a first pressure detector configured to detect a pressure on a rod side of the tilt cylinder;
   a second pressure detector configured to detect a pressure on a bottom side of the tilt cylinder;
   a third pressure detector configured to detect a pressure of the lift cylinder; and
   an estimation calculator configured to perform estimation calculation of a center of gravity of cargo loaded on the loading part using the pressure on the rod side of the tilt cylinder detected by the first pressure detector, the pressure on the bottom side of the tilt cylinder detected by the second pressure detector, the pressure of the lift cylinder detected by the third pressure detector, and data on a structure of the cargo handling device,
   wherein the estimation calculator comprises a parameter calculator configured to calculate parameters of a linear expression related to a rotational moment around the mast support on the basis of the pressure on the rod side of the tilt cylinder, the pressure on the bottom side of the tilt cylinder, the pressure of the lift cylinder, and the data on the structure of the cargo handling device, and
   wherein the data on the structure of the cargo handling device comprises at least one from among (i) a dimension, a weight, or a position of the lift cylinder; (ii) a dimension, a weight, a position, or a posture of the tilt cylinder; (iii) a dimension, a weight, a position, or center-of-gravity coordinates of the mast, and (iv) a dimension, a weight, a position, or center-of-gravity coordinates of the loading part.

2. The center of gravity estimation device according to claim 1, wherein the estimation calculator further comprises:
   a center of gravity calculator configured to calculate a center-of-gravity estimated value of the cargo in a front-rear direction of the vehicle body on the basis of the parameters of the linear expression calculated by the parameter calculator and the data on the structure of the cargo handling device.

3. The center of gravity estimation device according to claim 2, further comprising:
   an angle detector configured to detect a tilt angle of the mast; and
   a height detector configured to detect a height of the loading part, wherein the center of gravity calculator is configured to calculate the center-of-gravity estimated values of the cargo in the front-rear direction and a height direction of the vehicle body on the basis of the parameters of the linear expression, the data on the structure of the cargo handling device, the tilt angle of the mast detected by the angle detector, and the height of the loading part detected by the height detector.

4. The center of gravity estimation device according to claim 3, wherein the center of gravity calculator is configured to calculate the center-of-gravity estimated values of the cargo in the front-rear direction and the height direction of the vehicle body by obtaining coefficients of the linear expressions in two states with different tilt angles of the mast on the basis of the parameters of the linear expression, the data on the structure of the cargo handling device, the tilt angle of the mast, and the height of the loading part, and then solving simultaneous expressions of the linear expressions of the two states.

5. The center of gravity estimation device according to claim 2, wherein the center of gravity calculator is configured to calculate a center-of-gravity estimated value of the cargo in a height direction of the vehicle body on the basis of the parameters of the linear expression, the data on the structure of the cargo handling device, and the center-of-gravity estimated value of the cargo in the front-rear direction of the vehicle body after the center-of-gravity estimated value of the cargo in the front-rear direction of the vehicle body is calculated on the basis of the parameters of the linear expression and the data on the structure of the cargo handling device.

6. The center of gravity estimation device according to claim 2, wherein the parameter calculator is configured to calculate a load applied in an axial direction of the tilt cylinder, a distance between an axis of the tilt cylinder and the mast support, a load applied to the cargo, a load applied to a combined center of gravity of the cargo handling device, and a distance between a virtual line passing through the combined center of gravity of the cargo handling device and extending in the height direction of the vehicle body and the mast support as the parameters of the linear expression.

7. The center of gravity estimation device according to claim 6, wherein the parameter calculator is configured to:
calculate the load applied in the axial direction of the tilt cylinder on the basis of the pressure on the rod side of the tilt cylinder, the pressure on the bottom side of the tilt cylinder, and data on a structure of the tilt cylinder;
calculate the distance between the axis of the tilt cylinder and the mast support on the basis of the data on the structure of the tilt cylinder;
calculate the load applied to the cargo on the basis of the pressure of the lift cylinder and data on a structure of the lift cylinder;
calculate the load applied to the combined center of gravity of the cargo handling device on the basis of the data on the structure of the cargo handling device; and
calculate the distance between the virtual line and the mast support on the basis of the data on the structure of the cargo handling device.

8. The center of gravity estimation device according to claim 1, wherein the data on the structure of the cargo handling device comprises the dimension, the weight, or the position of the lift cylinder.

9. The center of gravity estimation device according to claim 1, wherein the data on the structure of the cargo handling device comprises the dimension, the weight, the position, or the posture of the tilt cylinder.

10. The center of gravity estimation device according to claim 1, wherein the data on the structure of the cargo handling device comprises the dimension, the weight, the position, or the center-of-gravity coordinates of the mast.

11. The center of gravity estimation device according to claim 1, wherein the data on the structure of the cargo handling device comprises the dimension, the weight, the position, or the center-of-gravity coordinates of the loading part.

* * * * *